(12) United States Patent
Voleti et al.

(10) Patent No.: US 10,908,088 B2
(45) Date of Patent: Feb. 2, 2021

(54) SCAPE MICROSCOPY WITH PHASE MODULATING ELEMENT AND IMAGE RECONSTRUCTION

(71) Applicant: The Trustees of Columbia University in the City of New York, New York, NY (US)

(72) Inventors: Venkatakaushik Voleti, New York, NY (US); Elizabeth M. C. Hillman, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 235 days.

(21) Appl. No.: 16/304,755

(22) PCT Filed: May 30, 2017

(86) PCT No.: PCT/US2017/034984
§ 371 (c)(1),
(2) Date: Nov. 27, 2018

(87) PCT Pub. No.: WO2017/210182
PCT Pub. Date: Dec. 7, 2017

(65) Prior Publication Data
US 2020/0249168 A1 Aug. 6, 2020

Related U.S. Application Data

(60) Provisional application No. 62/343,112, filed on May 30, 2016.

(51) Int. Cl.
*G02B 21/06* (2006.01)
*G01N 21/64* (2006.01)
(Continued)

(52) U.S. Cl.
CPC ..... *G01N 21/6458* (2013.01); *G02B 21/0032* (2013.01); *G02B 21/0048* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 8,619,237 B2   12/2013   Hillman et al.
9,655,523 B2   5/2017    Hillman et al.
(Continued)

FOREIGN PATENT DOCUMENTS

EP   2829903 A1   1/2015
WO   2009005748 A1   1/2009
(Continued)

OTHER PUBLICATIONS

Andreo et al., "Master in Photonics—Fast image restoration in light-sheet fluorescence microscopy with extended depth of field using GPUs microscopy with extended depth of field using GPUs,", ICFO—The Institute of Photonic Sciences (Sep. 10, 2015). p. 1-10.
(Continued)

*Primary Examiner* — Arnel C Lavarias
(74) *Attorney, Agent, or Firm* — Potomac Law Group, PLLC

(57) ABSTRACT

A scanning element routes a sheet or beam of excitation light through a first set of optical components and into a sample at an oblique angle. The position of the excitation light within the sample varies depending on the orientation of the scanning element. Fluorophores within the sample emit fluorescent detection light. The first set of optical components route the detection light back to the scanning element, and the scanning element routes the detection light through
(Continued)

a second set of optical components and into a camera. The second set of optical components includes a phase modulating element that induces a controlled aberration so as to homogenize point spread functions of points at, above, and below a focal plane when measured at the camera. In some embodiments, the images captured by the camera are processed to correct for aberration by performing deconvolution of a point spread function.

20 Claims, 6 Drawing Sheets

(51) Int. Cl.
    *G02B 21/00*     (2006.01)
    *G02B 21/36*     (2006.01)
(52) U.S. Cl.
    CPC ..... *G02B 21/0064* (2013.01); *G02B 21/0072* (2013.01); *G02B 21/0076* (2013.01); *G02B 21/0084* (2013.01); *G02B 21/361* (2013.01); *G02B 21/367* (2013.01)
(58) Field of Classification Search
    CPC ............ G02B 21/0048; G02B 21/0064; G02B 21/0072; G02B 21/0076; G02B 21/0084; G02B 21/361; G02B 21/367; G02B 21/06; G02B 21/36; G01N 21/6458; G01N 2021/6463; G01N 2021/6465; G01N 2021/6471
    USPC ....... 359/385, 362, 363, 368, 369, 388, 389, 359/390
See application file for complete search history.

(56) References Cited

U.S. PATENT DOCUMENTS

| | | | |
|---|---|---|---|
| 10,061,111 | B2 | 8/2018 | Hillman |
| 2006/0114542 | A1 | 6/2006 | Bloom |
| 2009/0250632 | A1 | 10/2009 | Kempe et al. |
| 2010/0168586 | A1 | 7/2010 | Hillman et al. |
| 2010/0214404 | A1 | 8/2010 | Chen et al. |
| 2010/0245822 | A1 | 9/2010 | Garab et al. |
| 2014/0045347 | A1 | 2/2014 | Im |
| 2014/0346328 | A1* | 11/2014 | Niu ................ G01N 21/84 250/225 |
| 2015/0323787 | A1* | 11/2015 | Yuste ............. G06K 9/00134 348/79 |
| 2018/0214024 | A1 | 8/2018 | Hillman et al. |
| 2019/0302437 | A1* | 10/2019 | Hillman .......... G02B 21/0076 |
| 2019/0356902 | A1* | 11/2019 | Shechtman ........ G02B 21/008 |
| 2020/0090399 | A1* | 3/2020 | Kalkbrenner ......... G06T 17/00 |

FOREIGN PATENT DOCUMENTS

| | | |
|---|---|---|
| WO | 2015109323 A2 | 7/2015 |
| WO | 2015124648 A1 | 8/2015 |
| WO | 2017210159 A1 | 12/2017 |
| WO | 2017210182 A1 | 12/2017 |
| WO | 2018013489 A1 | 1/2018 |
| WO | 2018052905 A1 | 3/2018 |
| WO | 2018064149 A1 | 4/2018 |
| WO | 2018089865 A1 | 5/2018 |

OTHER PUBLICATIONS

Bouchard et al., "Laser-Scanning Intersecting Plane Tomography. (L-SIPT) for high speed 3D optical imaging and microscopy". In: OSA Biomedical Topical Meetings, OSA Technical Digest, Optical Society of America, (Apr. 11-14, 2010, Miami, FL), (2010), 3 pgs.
Bouchard et al., "Swept confocally-aligned planar excitation (SCAPE) microscopy for high-speed volumetric imaging of behaving organisms," Nature Photonics, Jan. 19, 2015, vol. 9(2), pp. 113-119.
Dean et al., "Deconvolution-free Subcellular Imaging with Axially Swept Light Sheet Microscopy" Biophysics Journal, vol. 108, Issue 12, pp. 2807-2815, Jun. 2015.
Demenikov et al., "Image artifacts in hybrid imaging systems with a cubic phase mask", Optics Express, Apr. 2, 2010, vol. 18., No. 8, p. 8207-8212.
International Search Report and Written Opinion for International Application No. PCT/US2017/034984 dated Aug. 25, 2017.
Kepshire et al., "A microcomputed tomography guided fluorescence tomography system for small animal molecular imaging", Review of Scientific Instruments, vol. 80, Issue 4, pp. 043701, Apr. 2009.
Lauer, "Deconvolution with a spatially-variant PSF", National Optical Astronomy Observatory, Aug. 12, 2002.
Olarte et al., "Decoupled illumination detection in light sheet microscopy for fast volumetric imaging," Optica, Aug. 4, 2015, vol. 2, No. 8, p. 702-705.
Olarte et al., "Decoupled illumination detection in light sheet microscopy for fast volumetric imaging," Optica: Supplementary Material, Aug. 4, 2015, p. 1-6.
Prevedel et al., "Simultaneous whole-animal 3D imaging of neuronal activity using light-field microscopy", Nature Methods, vol. 11, Issue 7, pp. 727-730, May 2014.
Quirin et al., "Calcium imaging of neural circuits with extended depth-of-field light-sheet microscopy," Optics Letters, vol. 41, No. 5, pp. 855-858, Mar. 2016.
Quirin et al., "Instantaneous three-dimensional sensing using spatial light modulator illumination with extended depth of field imaging:", Opt.ics Express, Jun. 27, 2013, p. 16007-16021.
Quirin et al., "Simultaneous imaging of neural activity in three dimensions", Frontiers in Neural Circuits, vol. 8, Article 29, pp. 1-11, Apr. 2014.
Tomer et al., "SPED light sheet microscopy: fast mapping of biological system structure and function." Cell 163.7 (Nov. 2015): 1796-1806.
Extended European Search Report dated Jan. 16, 2020 for European Patent Application No. 17807328.4.
Fournel et al., "Information Optics and Photonics," Springer, Jan. 1, 2010, pp. 243-245.
Patel et al., "High-speed, 3D SCAPE Microscopy of Fresh Tissues for in situ Histopathology," Proceesings of Biomedical Optics Congress 2016, Fort Lauderdale, FL, USA, vol. 2, Jan. 1, 2016, pp. TTu2B.2.

* cited by examiner

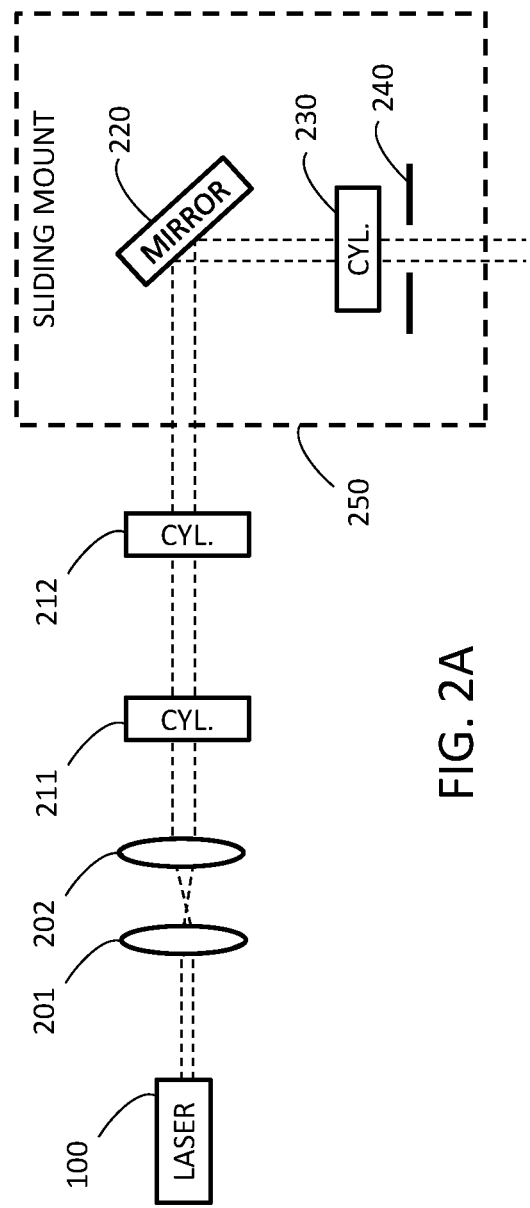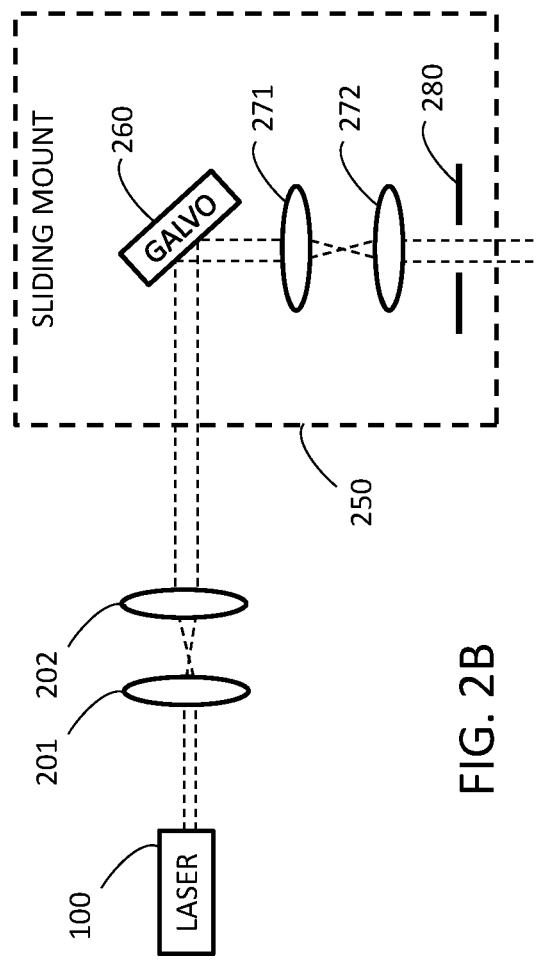
FIG. 2A
FIG. 2B

SCAPE MICROSCOPY WITH PHASE MODULATING ELEMENT AND IMAGE RECONSTRUCTION

CROSS REFERENCE TO RELATED APPLICATIONS

This Application is a U.S. national stage filing under 35 U.S.C. § 371 of International Application No. PCT/US2017/034984, filed May 30, 2017, which claims the benefit of U.S. Provisional Application 62/343,112, filed May 30, 2016, each of which is incorporated herein by reference in its entirety.

STATEMENT REGARDING FEDERALLY-SPONSORED RESEARCH

This invention is made with government support under grants NS094296, NS076628, NS063226, NS053684 awarded by the NIH, 0954796 and 0801530 awarded by the National Science Foundation, and W911NF-12-0594 awarded by Army/ARO. The government has certain rights in the invention.

BACKGROUND

SCAPE microscopy is a technique for high-speed 3D microscopy that uses swept, confocally aligned planar excitation. Some examples of SCAPE imaging systems are disclosed in publication WO 2015/109323, which is incorporated herein by reference in its entirety. In SCAPE, an oblique sheet of light (e.g., laser light) is swept through the sample, and fluorescence from the sample is captured by a camera to produce an image. SCAPE can achieve resolutions rivaling techniques such as light-sheet, confocal, and two-photon microscopy, but can operate at much higher speeds.

In SCAPE systems, the excitation path includes the optical components starting at the light source and ending at the sample; and the detection path includes the optical components starting at the sample and ending at the camera. Some embodiments of SCAPE microscopy use two objective lenses in the detection arm placed at an angle with respect to one another for image rotation. But this configuration results in a net loss of light captured at the detector, which can adversely affect the numerical aperture, resolution, and light throughput of the imaging system.

SUMMARY OF THE INVENTION

One aspect of the invention is directed to a first apparatus that comprises a first set of optical components having a proximal end and a distal end, the first set of optical components including an objective disposed at the distal end of the first set of optical components. This apparatus also comprises a second set of optical components having a proximal end and a distal end, the second set of optical components including a phase modulating element. This apparatus also comprises a scanning element that is disposed proximally with respect to the proximal end of the first set of optical components and proximally with respect to the proximal end of the second set of optical components. The scanning element is arranged to route excitation light arriving at the scanning element so that the excitation light will pass through the first set of optical components in a proximal to distal direction and project into a sample that is positioned distally beyond the objective. The excitation light is projected into the sample at an oblique angle, and the excitation light is projected into the sample at a position that varies depending on an orientation of the scanning element. The first set of optical components is arranged to route detection light from the sample in a distal to proximal direction back to the scanning element. The scanning element is also arranged to route the detection light so that the detection light will pass through the second set of optical components in a proximal to distal direction. This apparatus also comprises a camera optically positioned to capture images formed by the detection light that has passed through the second set of optical components. The phase modulating element induces a controlled aberration so as to homogenize point spread functions of points at, above, and below a focal plane when measured at the camera.

In some embodiments of the first apparatus, the phase modulating element comprises a phase plate. In some embodiments of the first apparatus, the phase modulating element comprises a spatial light modulator. In some embodiments of the first apparatus, the phase modulating element comprises a deformable mirror.

In some embodiments of the first apparatus, the objective has a pupil plane, and the phase modulating element is positioned at a plane that is conjugate to the pupil plane of the objective. Some of these embodiments further comprise an aperture stop positioned (a) adjacent to the phase modulating element and (b) proximally with respect to the phase modulating element.

In some embodiments of the first apparatus, the detection light forms a stationary conjugate image plane between the proximal end and the distal end of the second set of optical components.

In some embodiments of the first apparatus, the light detector array comprises a 2D image sensor, and the camera sequentially captures a plurality of images formed by the detection light that has passed through the second set of optical components, each of the plurality of images corresponding to a respective frame of image date. In these embodiments, the apparatus further comprises a processor programmed to correct for aberration in the frames of image data. In some of these embodiments, the processor corrects for aberration in the frames of image data by performing deconvolution of a point spread function. In some of these embodiments, the point spread function is either a measured point spread function or a simulated point spread function.

In some embodiments of the first apparatus, the light detector array comprises a linear image sensor. In some of these embodiments, the scanning element comprises an x-y galvanometer. In some of these embodiments, the excitation light has a wavelength such that excitation of a fluorophore in the sample requires near-simultaneous absorption of a plurality of photons.

Some embodiments of the first apparatus further comprise a beam splitter disposed between the proximal end of the second set of optical components and the scanning element, and a source of the excitation light. In these embodiments, the source of the excitation light is aimed so the excitation light is directed into the beam splitter, the beam splitter is arranged to route the excitation light towards the scanning element, and the beam splitter is arranged to route detection light arriving from the scanning element into the proximal end of the second set of optical components.

In some embodiments of the first apparatus, the excitation light comprises a sheet of excitation light. This sheet of excitation light may be generated by at least one of (a) a cylindrical lens arranged to expand light from a light source into the sheet of excitation light; (b) an aspheric mirror arranged to expand light from a light source into the sheet of excitation light; (c) a spatial light modulator arranged to expand light from a light source into the sheet of excitation light; (d) a second scanning element arranged to expand light from a light source into the sheet of excitation light; and (e) an oscillating galvanometer mirror arranged to expand light from a light source into the sheet of excitation light.

Some embodiments of the first apparatus further comprise a beam splitter disposed between the proximal end of the second set of optical components and the scanning element, and a source of the excitation light. In these embodiments, the source of the excitation light is aimed so the excitation light is directed into the beam splitter, the beam splitter is arranged to route the excitation light towards the scanning element, the beam splitter is arranged to route detection light arriving from the scanning element into the proximal end of the second set of optical components, the light detector array comprises a 2D image sensor, the excitation light comprises a sheet of excitation light, the camera sequentially captures a plurality of images formed by the detection light that has passed through the second set of optical components, each of the plurality of images corresponding to a respective frame of image date, and the apparatus further comprises a processor programmed to correct for aberration in the frames of image data. In some of these embodiments, the processor corrects for aberration in the frames of image data by performing deconvolution of a point spread function. In some of these embodiments, the objective has a pupil plane, and the phase modulating element is positioned at a plane that is conjugate to the pupil plane of the objective. In some of these embodiments, the phase modulating element has a phase profile of $$\theta(x,y)=2\pi\alpha(x^3+y^3),$$

where x and y are normalized pupil coordinates and α is a tuning parameter set to |Ψ/2|, where $$\Psi(u_2,v_2;dz)=-(1/2\lambda)*NA^2*(u_2^2+v_2^2)*dz/n,$$

where λ is a wavelength of light passing through the phase modulating element, NA is a numerical aperture of the objective, u and v are normalized pupil coordinates, n is an index of refraction of an immersion medium underneath the objective, and dz is one half of a range of depths to be imaged.

In some embodiments of the first apparatus, the phase modulating element has a phase profile of $$\theta(x,y)=2\pi\alpha(x^3+y^3),$$

where x and y are normalized pupil coordinates and a is a tuning parameter set to |Ψ/2|, where $$\Psi(u_2,v_2;dz)=-(1/2\lambda)*NA^2*(u_2^2+v_2^2)*dz/n,$$

where λ is a wavelength of light passing through the phase modulating element, NA is a numerical aperture of the objective, u and v are normalized pupil coordinates, n is an index of refraction of an immersion medium underneath the objective, and dz is one half of a range of depths to be imaged.

Another aspect of the invention is directed to a second apparatus that comprises an objective and a plurality of optical elements disposed in a detection path arranged to receive light from the objective. The plurality of optical elements disposed in the detection path includes a scanning element. The scanning element is arranged to (a) route excitation light into the objective so as to generate a sweeping excitation beam through a forward image plane of the objective and (b) simultaneously route image light returning through the objective along the detection path to form a conjugate image. This apparatus further comprises a light detector array positioned to capture images of the conjugate image, and a phase modulating element disposed in the detection path between the scanning element and the light detector array. The phase modulating element extends a depth of field in the detection path.

In some embodiments of the second apparatus, the phase modulating element extends the depth of field by inducing a controlled aberration so as to homogenize point spread functions of points at, above, and below a focal plane when measured at the light detector array.

In some embodiments of the second apparatus, the aberration is corrected by an image processing algorithm. In some embodiments of the second apparatus, the aberration is corrected by deconvolution of a measured or simulated point spread function. In some embodiments of the second apparatus, the light detector array comprises a 2D image sensor. In some embodiments of the second apparatus, the light detector array comprises a linear image sensor.

Another aspect of the invention is directed to a third apparatus that comprises a light source; a cylindrical lens or a scanner that expands light from the light source into a sheet of light; a beam splitter disposed in a path of the sheet of light; a scanning element disposed in a path of the sheet of light; a first telescope having a proximal end and a distal end, with an objective disposed at the distal end of the first telescope; and a second telescope having a proximal end and a distal end, the second telescope having an optical axis. The beam splitter routes the sheet of light towards the scanning element. The scanning element routes the sheet of light into the proximal end of the first telescope. The first telescope routes the sheet of light in a proximal to distal direction through the objective, accepts fluorescent light through the objective and routes the fluorescent light in a distal to proximal direction back to the scanning element. The scanning element routes the fluorescent light through the beam splitter and into the proximal end of the second telescope. The second telescope forms an image from the fluorescent light at a conjugate image plane. This apparatus further comprises a camera positioned on the same optical axis as the second telescope and configured to capture blurred images of the conjugate image plane; a phase modulating element disposed between the second telescope and the camera; and an image processor programmed to deblur images captured by the camera.

In some embodiments of the third apparatus, the light source comprises a laser. In some embodiments of the third apparatus, the phase modulating element comprises a phase plate. In some embodiments of the third apparatus, the phase modulating element comprises at least one of a spatial light modulator and a deformable mirror. In some embodiments of the third apparatus, the image processor is programmed to deblur the images using a deconvolution algorithm.

Another aspect of the invention is directed to a first method of imaging a sample. This method comprises projecting a sheet of excitation light into a sample, wherein the sheet of excitation light is projected into the sample at an oblique angle, and wherein the sheet of excitation light is projected into the sample at a position that varies depending on an orientation of a scanning element. This method also comprises routing detection light arriving from the sample back to the scanning element, and using the scanning element to reroute the detection light into an optical system that induces a controlled aberration so as to homogenize point spread functions of points at, above, and below a focal plane when measured at the camera. This method also comprises using the aberrated detection light to form a plurality of images at a plurality of times, each of the times corresponding to a different orientation of the scanning element, and capturing the plurality of images.

Some embodiments of the first method further comprise correcting for the aberration in the plurality of images.

In some embodiments of the first method, the correcting step comprises performing deconvolution of a point spread function. In some embodiments of the first method, the point spread function is either a measured point spread function or a simulated point spread function.

In some embodiments of the first method, the aberration is induced by a phase modulating element having a phase profile of $$\theta(x,y)=2\pi\alpha(x^3+y^3),$$

where x and y are normalized pupil coordinates and a is a tuning parameter set to $|\Psi/2|$, where $$\Psi(u_2,v_2;dz)=-(1/2\lambda)*NA^{2}*(u_2^2+v_2^2)*dz/n,$$

where $\lambda$ is a wavelength of light passing through the phase modulating element, NA is a numerical aperture of the objective, u and v are normalized pupil coordinates, n is an index of refraction of an immersion medium underneath the objective, and dz is one half of a range of depths to be imaged.

BRIEF DESCRIPTION OF THE DRAWINGS

FIG. 2A depicts a design for forming a sheet of light in which all positions on the sheet are illuminated simultaneously.

FIG. 2B depicts a design for rapidly scanning a pencil beam of light so as to form a virtual sheet of light.

Embodiments will hereinafter be described in detail below with reference to the accompanying drawings, wherein like reference numerals represent like elements.

DESCRIPTION OF THE PREFERRED EMBODIMENTS

This application describes an alternative approach for implementing SCAPE microscopy that avoids many of the problems associated with those embodiments of SCAPE that use two objective lenses in the detection arm placed at an angle with respect to one another for image rotation. This alternative approach relies on a phase modulating element to extend the effective depth of field of the detection arm.

Figure 1:
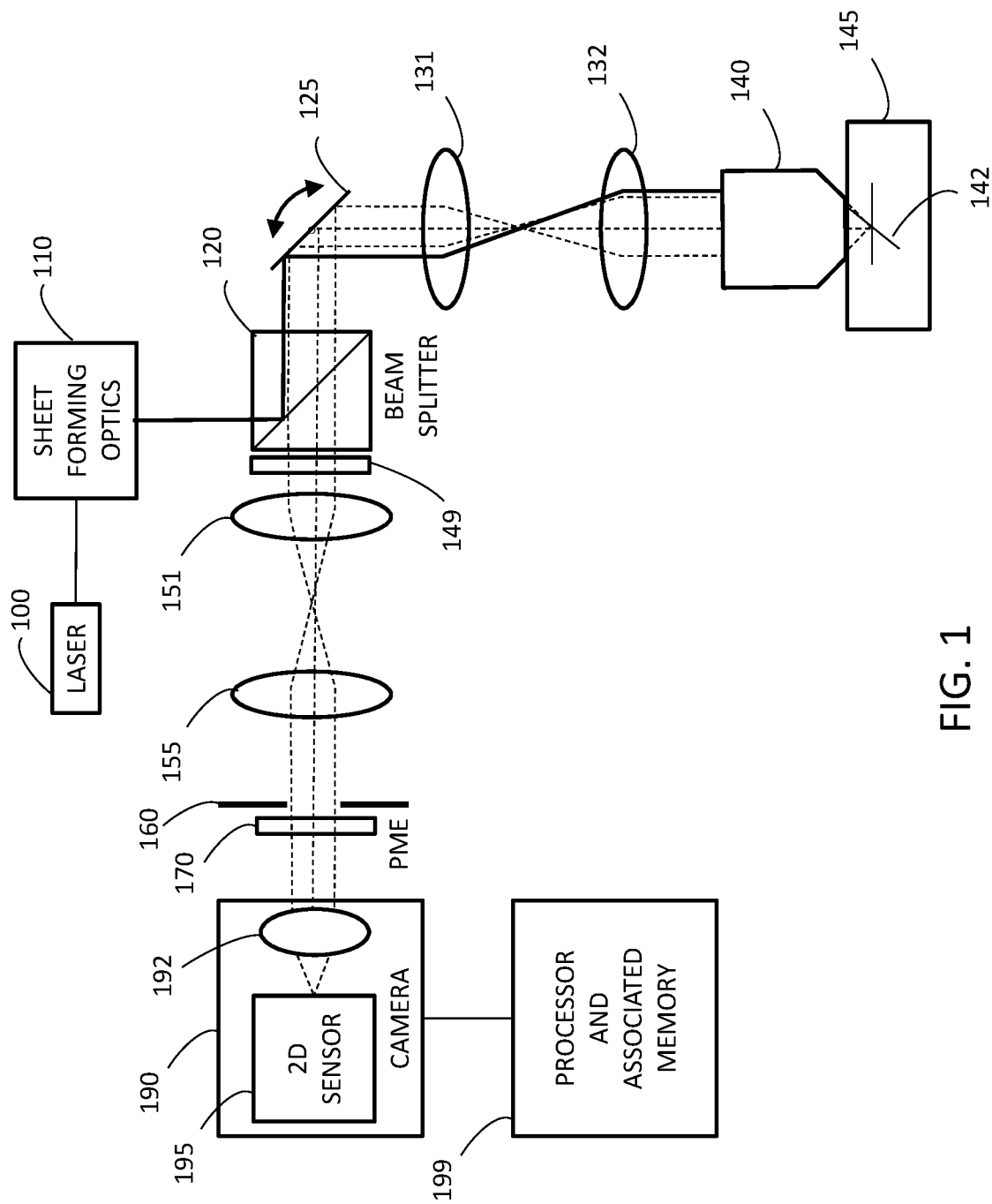
FIG. 1 depicts an embodiment of a SCAPE microscope that uses a phase modulating element.

FIG. 1 depicts a first embodiment of a SCAPE microscope that uses a phase modulating element (PME) 170. Examples of phase modulating elements that may be used in this embodiment include but are not limited to phase plates (e.g., cubic, logarithmic, etc.) and spatial light modulators (SLMs).

A beam of light from a light source (e.g., laser 100 or an LED) having a wavelength within the excitation spectrum of a fluorophore of interest is passed through sheet forming optics 110. This sheet forming optics 110 converts the beam into a sheet of light and also dictates the geometric properties of the light that will excite the fluorescence in the sample.

In some embodiments, the sheet forming optics 110 shapes the light from the light source 100 into a true sheet of light (i.e., a sheet in which all positions on the sheet of light are illuminated simultaneously). One approach for accomplishing this is depicted in FIG. 2A. A light source (e.g., laser 100 or an LED) emits light (e.g., monochromatic, coherent, polarized light; or incoherent light), and that light is directed through an isotropic beam expander 201, 202 that uniformly magnifies the profile of the light source. From there, the light passes through an anamorphic beam expander that magnifies beam from a circular shape to an elliptical shape. This anamorphic beam expander may be implemented, for example, using a pair of cylindrical lenses 211, 212 and/or matched prism pairs and/or aperture cropping with a slit, etc.

The light is then reflected off of a sliding mirror 220 and is focused along the expanded dimension by a third cylindrical lens 230 and subsequently clipped along the nonexpanded dimension by slit shaped aperture 240. The slit width of this aperture 240 is used to control the sheet thickness under the objective (140, shown in FIG. 1), and by extension the depth of field of the microscope. Note that as used herein, the term "objective" is used in its generic sense to refer to the last optical component prior to the sample 145. It could be, for example, a simple lens element, a microscope-style objective, etc. Optionally, the sliding mirror 220, the third cylindrical lens 230 and the aperture slit 240 may all be mechanically coupled to one another on a mount 250 that is capable of translating from side to side as a single unit, to provide adjustability. This adjustability may be motor-driven or manual and various means of adjustment having an equivalent effect will be evident to persons skilled in the relevant art. A wide variety of alternative approaches for generating a sheet of light in which all positions on the sheet are illuminated simultaneously will be readily apparent to persons skilled in the relevant arts.

In alternative embodiments, the sheet forming optics 110 shapes the light from the light source 100 by rapidly scanning a pencil beam of light so as to create a virtual sheet of light. In these embodiments, the illumination at different positions within the sheet occurs at different instants of time. These embodiments create an oblique line beyond the objective that is then scanned back and forth across the lateral field of view to form the virtual sheet.

FIG. 2B depicts one approach for implementing this virtual sheet embodiment. A light source (e.g., laser 100) emits light (e.g., monochromatic, coherent, polarized light), and that light is directed through an isotropic beam expander 201, 202 that uniformly magnifies the profile of the light source. The isotopically expanded beam is then directed onto a galvanometer mirror 260 that reorients the light and scans it into a sheet. Subsequently, the sheet of light is directed through a relay telescope 271, 272 and an aperture slit 280. The function of the relay telescope 271, 272 in this embodiment is to provide additional magnification if necessary and image the galvanometer mirror 260 onto a plane conjugate to the back focal plane of the objective (140, shown in FIG. 1). And the function of the aperture slit 280 is similar to the FIG. 2A embodiment described above. Optionally, the galvanometer mirror 260, the relay telescope 271, 272, and the aperture slit 280 may all be mechanically coupled to each other on a mount 250 that is capable of translating from side to side as a single unit to provide similar adjustability to the FIG. 2A embodiment. A wide variety of alternative approaches for using the scanning to generate a virtual sheet of light will be readily apparent to persons skilled in the relevant arts.

Returning to FIG. 1, light exiting the sheet forming optics 110 enters the dichroic beam splitter 120, which separates the shorter wavelength light used for excitation of fluorescence from the longer wavelengths of light emitted by the fluorescent molecules. In this embodiment, the dichroic beam splitter 120 was chosen such that the microscope was set up in long-pass configuration wherein fluorescence is transmitted through the dichroic beam splitter. The dichroic beam splitter 120 reflects the shorter wavelength excitation light towards the scanning element 125.

In alternative embodiments (e.g., two-photon embodiments, where the excitation light has a longer wavelength than the fluorescence) the dichroic beam splitter 120 should be configured to reflect the longer wavelengths and pass the shorter wavelength. In some alternative embodiments, it is also possible to use a shortpass dichroic beam splitter wherein the microscope is set up in short-pass configuration. Collected fluorescence from the sample would be reflected off of the dichroic beam splitter 120 in this case.

In the FIG. 1 embodiment, the scanning element 125 may be implemented using a planar scanning mirror with a single degree of freedom. But in alternative embodiments, a wide variety of alternative approaches for implementing scanning may be used, including but not limited to non-planer scanning mirrors, moving prisms, etc. The excitation light arriving from the dichroic beam splitter 120 at the scanning element 125 is reflected and scanned by the scanning element 125, after which it continues on towards a first set of optical components (e.g., scan-tube lens telescope 131, 132 and objective 140). The first set of optical components has a proximal end and a distal end, and the scanning element 125 routes the excitation light so that it will pass through the first set of optical components 131-140 in a proximal to distal direction.

An objective 140 is disposed at the distal end of the first set of optical components. After passing through the first set of optical components 131-140, the excitation light will project into a sample 145 that is positioned distally beyond the objective 140. The excitation light is projected into the sample 145 at an oblique angle, and the position of the excitation light within the sample 145 varies depending on an orientation of the scanning element 125.

In some embodiments, the excitation light arrives at the back aperture of the objective 140 off-axis. As described previously by Bouchard et al (2015), this creates an oblique sheet of light 142 through the sample 145. Note that in those embodiments that employ an adjustable sliding mount (250 in FIGS. 2A and 2B), and the location of the adjustable sliding mount determines the angle of the oblique light sheet through the sample 145. It is also possible to adjust the location of the adjustable sliding mount 250 to accommodate for the various back aperture sizes of different objectives 140.

The oblique sheet of light 142 will excite fluorescence in the sample 145. Fluorescent light collected from this sample is then collected by the same objective 140. The objective 140 and the remainder of the first set of optical components 131, 132 routes detection light from the sample in a distal to proximal direction back to the scanning element 125. A conjugate image of the detection light is formed between components 131 and 132. The location of this conjugate image plane changes in tandem with the laser light sweeping through the sample 145.

The detection light arriving at the scanning element is rerouted by the scanning element 125 so that the detection light will pass through the second set of optical components 149-170 in a proximal to distal direction. In the illustrated embodiment, the second set of optical components includes an optional emission filter 149 followed by a telescope 151, 155, an aperture stop 160, and a PME 170. Note that in the FIG. 1 embodiment, the detection light will pass through the dichroic beam splitter 120 before entering the proximal-most element the second set of optical components (i.e., lens 151). A conjugate image plane exists between lenses 151 and 155. Notably, the scanning element 125 descans the incoming detection light. As a result of the descanning, this conjugate image plane remains a stationary, despite the fact that the excitation light is scanning different sections of the sample 145 in object space.

Light from the conjugate image plane then continues on through the distal lens 155 of the telescope and into the PME 170. The phase modulating element is positioned in the detection optical path at a position that is distal to the dichroic beam splitter 120. In some preferred embodiments, the PME 170 is positioned conjugate to the pupil plane of the objective 140.

In a traditional microscope, the sharpest image of the sample is formed when the camera is in focus with the primary lens's focal plane; the resolution at this plane is better than the resolution of the planes above and below and is characterized by the system's point spread function. The role of the PME 170 is to induce a controlled aberration into the system such that the point spread functions of points at, above, and below the focal plane (i.e., at different positions along the Z axis) when measured at the camera 190 are homogenized. This aberration degrades the point spread function of the microscope at the focal plane but retains the degraded point spread function over a wide range of depths. This, in effect, allows the microscope to image multiple planes (i.e. multiple depths) with the same—albeit reduced—in-plane resolution. The introduction of the PME 170 thus improves the system's resolution and extends the system's depth of field. The general technique is known in other fields as wavefront encoding. However, here it is employed to derotate a conjugate oblique image plane.

In some preferred embodiments, the PME is a cubic phase plate. In these embodiments, the phase profile of the cubic phase plate may be described by the following equation:

$$\theta(x,y) = 2\pi\alpha(x^3 + y^3),$$

where x and y are normalized pupil coordinates and a is the tuning parameter generally set to $|\Psi/2|$, where $$\Psi(u_2, v_2; dz) = -(1/2\lambda) * NA^2 * (u_2^2 + v_2^2) * dz/n,$$

where $\lambda$ is the wavelength of light passing through the phase plate, NA is the numerical aperture of the objective 140, u and v are the normalized pupil coordinates, n is the index of refraction of an immersion medium underneath the objective, and dz is one half the depth of focus (i.e. the range of depths to be imaged). Additional information regarding characteristics of the phase plate can be found in S. Quinn et al., "Instantaneous Three-Dimensional Sensing Using Spatial Light Modulator Illumination with Extended Depth of Field Imaging," Opt. Express 21, 16007-16021 (2013).

The phase function of the cubic phase plate can also be expressed as the sum of a set of Zernike polynomials as follows:

$$\phi(x, y) = \frac{\pi\alpha}{2}(2Z_2 + 2Z_3 + Z_7 + Z_8 + Z_{10} - Z_{11})$$

Figure 3B:
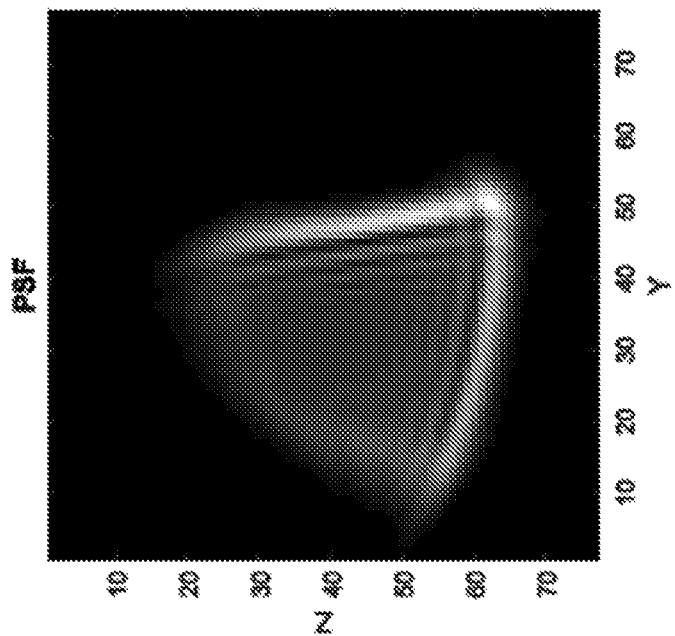
FIGS. 3A and 3B depict, respectively, a phase function and a corresponding irradiance point spread function.
Figure 3A:
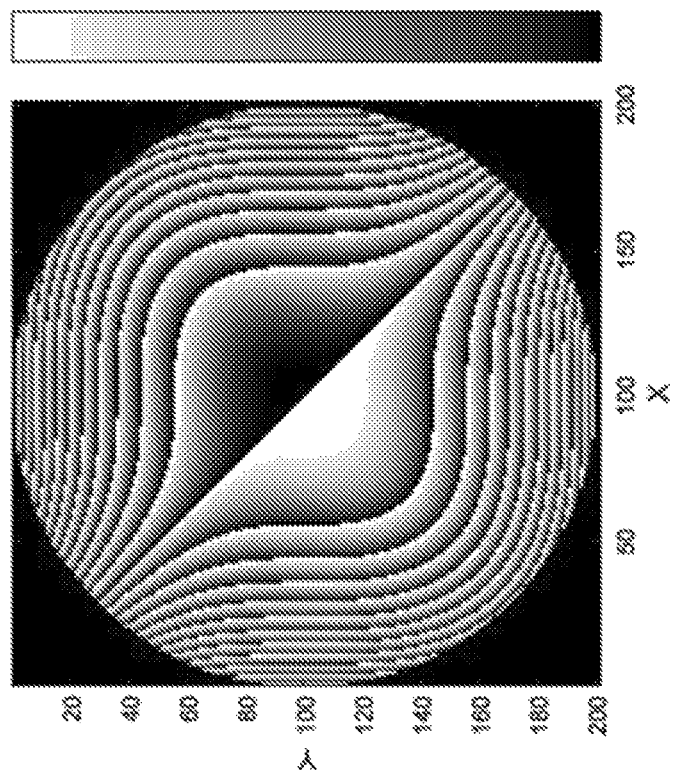

In one example, a mathematical representation of a cubic phase plate was created using FRED Optical Engineering Software and simulated to be between two thin lenses. An irradiance spread function of an on-axis point at the focal plane of one of the lenses was determined. A phase function that was calculated with an alpha value of 36 and its corresponding irradiance point spread function are shown in FIGS. 3A and 3B, respectively.

Phase plates are generally manufactured with tight tolerances (+/−0.02λ) and are meant to be used over a specific wavelength range. In some embodiments, this wavelength range would correspond to the emission spectra of whatever fluorescent indicator is being excited in the sample. Typical ranges for these wavelengths will be between 500 and 700 nm. In some embodiments, the system may be configured to swap in one of a plurality of different phase plates depending on the wavelength of the fluorophore that is being excited in the sample 145.

As explained in S. Quinn et al., "Simultaneous Imaging of Neural Activity in Three Dimensions.," Front. Neural Circuits 8, 29 (2014), the actual height of the phase plate may be calculated using the following equation:

$$h(x, y) = \left(\frac{\theta(x, y) * \pi}{2}\right)\left(\frac{\lambda}{n - 1}\right)$$

Where h is the height of the phase plate and n is the refractive index of the material composing the phase plate.

Designing phase plates specified to tighter wavelength ranges would also reduce the chromatic aberrations resulting from deviations from the design wavelength. Multi-color imaging can be performed in the conventional sense by placing an image splitter after the lens following the phase plate. Alternatively, it is also possible to perform spectral separation of emitted fluorescence prior to the phase plate. By incorporating phase plates into a standard image splitter, each phase plate can be designed for a narrower spectral range.

In alternative embodiments, alternative equations may be implemented in the phase plate and/or a different class of phase plate (e.g., a logarithmic phase plate) may be used in place of the cubic phase plate described above. In some embodiments, the desired phase profile can be etched into a substrate such as glass (e.g. using lithography).

In some embodiments, a different type of phase modulating element 170 may be used in place of the phase plate described above. Examples of such alternative phase modulating element include spatial light modulators and deformable mirrors. Note that some of these alternative phase modulating elements are programmable (e.g., SLMs). In those cases, any of the phase profiles described above can be imparted onto the programmable phase modulating element.

Optionally, a circular aperture (aperture stop 160) may be placed in front of the PME 170 (i.e., on the proximal side of the PME) to modulate the numerical aperture of the microscope's detection-side optics. Optionally, a long-pass emission filter 149 may be positioned at any appropriate location in the second set of optical components (e.g., between the dichroic beam splitter 120 and lens 151, as depicted in FIG. 1, or between lens 155 and the camera 190).

After being modulated by the phase modulating element 170 (e.g., the phase plate), the light is captured using a camera 190. The camera is optically positioned to capture images formed by the detection light that has passed through the second set of optical components. In its simplest form, the camera 190 is a single lens 192 that converges image light onto a 2D camera sensor 195. In alternative embodiments, the illustrated single lens 192 can be replaced with a more complex zoom lens module to provide variable magnification to the system. Optionally, image intensifiers and image splitters may also be added for improved SNR and spectral separation respectively.

The sensor 195 of the camera 190 captures a plurality of frames, each of which represents a 2D image of the fluorescence emanating from a plane within the sample 145 at a different point in time.

Because the conjugate image plane that appears between lenses 151 and 155 is not perpendicular to the axial axis of the second set of optical components, when that image reaches the sensor 195 of the camera 190, most portions of the images captured by the sensor 195 will be blurred (i.e., out of focus). The PME 170 alleviates this blurred condition to a significant extent by extending the depth of field in the detection path.

This blurred condition can be improved dramatically by processing the 2D images that have been captured by the camera's sensor 195. More specifically, each of the images that are captured by the camera's sensor 195 is stored in memory (e.g., RAM, a hard drive, or an SSD), and those images can be processed by a suitably programmed processor 199 to correct for aberration in each of the images. In some embodiments, this processing corrects for aberration by performing deconvolution of a measured point spread function. In other embodiments, this this processing corrects for aberration by performing deconvolution of a simulated point spread function. Alternative approaches for correcting the aberration may also be used. The aberration-corrected images are then stored in memory.

One suitable approach for processing each of the 2D images that has been captured by the camera's sensor 195 is as follows: Initially, we note that the transverse point spread function (X-Y) of a system with a cubic phase plate is depth dependent. In some embodiments, image restoration may be performed by storing an empirically determined transverse point spread function at each depth in a look-up table and performing deconvolution with either a Weiner filter or iterative deconvolution. Any of a wide variety of techniques for implementing deconvolution may be used, including but not limited to linear autoregressive, ARMA, and Weiner Filters, Lucy-Richardson deconvolution—Bayesian maximum likelihood expectation maximization solution, Landweber deconvolution, Wavelet based deconvolution, and Maximum Entropy Based Deconvolution. The approaches disclosed in the following three publications, each of which is incorporated herein by reference, may also be used: S. Quirin at al., "Calcium imaging of neural circuits with extended depth-of-field Lightsheet Microscopy," Opt. Lett. 41, 855 (2016); 4. D. C. Andreo, et al., "Master in Photonics Fast Image Restoration in Light-Sheet Fluorescence Microscopy with Extended Depth of Field Using GPUs," (2015); O. Olarte, et al., "Decoupled Illumination Detection in Light Sheet Microscopy for Fast Volumetric Imaging," Optica 2, 702-705 (2015).

Figure 4B:
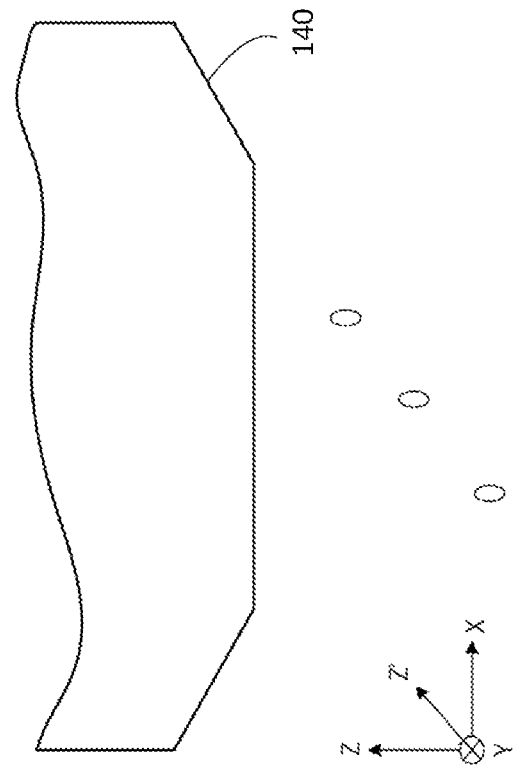
FIGS. 4A and 4B depict the sectioning effect of the oblique light sheet used in SCAPE microscopy.
Figure 4A:
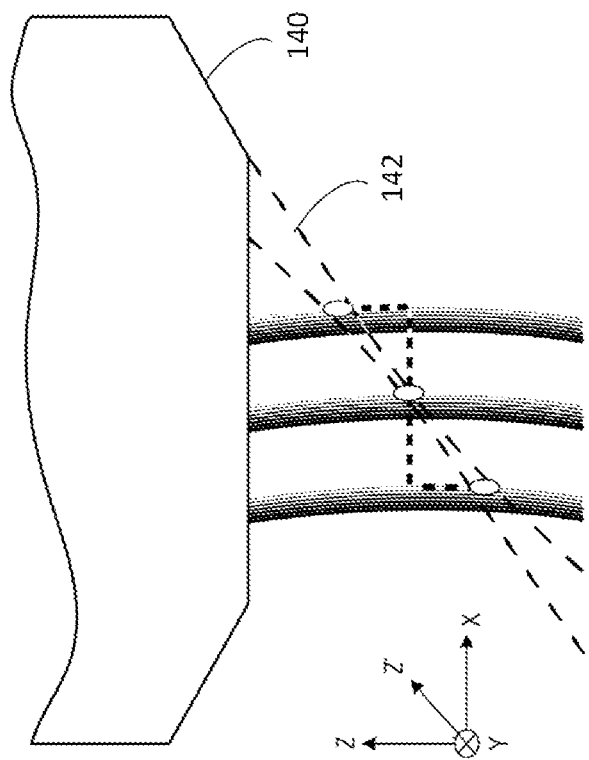

FIGS. 4A and 4B show the sectioning effect of the oblique light sheet 142 used in SCAPE microscopy. The sheet of light 142 scans back and forth within the sample 145 along the X direction and the camera captures an image of the sheet in the Y-Z' dimension. The sheet in SCAPE provides sectioning along the X dimension in a manner that is similar to the way that the light sheet in SPIM light sheet systems provides sectioning in the Z dimension. The secondary lobes along the X dimension of the transverse (X-Y) point spread function are projected onto the Z' axis. Because the transverse profile changes slightly over the range of depths, the image acquired by the camera frame will have a spatially varying PSF. Depending upon the design of the PME however, uniformity may be assumed over a part or all of the image. If complete uniformity is assumed, a single point spread function may be acquired/calculated within the center of the Y-Z' image and the aberrated image may be restored via non-blind deconvolution techniques.

If the point spread function varies dramatically over the range of depths (Z'), then a point spread function may be acquired/calculated at each depth and more complex deconvolution techniques with spatially varying kernels will be used. Examples of suitable techniques for dealing with variations in the point spread function can be found in Lauer, Tod, "Deconvolution with a Spatially-Variant PSF," Astronomical Telescopes and Instrumentation, International Society for Optics and Photonics (2002), which is incorporated herein by reference. Alternative techniques that will be apparent to persons skilled in the relevant arts may also be used.

Note that the quadratic shift observed in cubic phase plates are a property of higher order anti-symmetric phase masks. Rotationally symmetric phase masks, such as radial quartic and logarithmic functions induce no image artifacts but face a steeper tradeoff between contrast and depth of field, as explained in M. Demenikov et al., "Image Artifacts in Hybrid Imaging Systems with a Cubic Phase Mask.," Opt. Express 18, 8207-8212 (2010). Regardless, the implementation of such phase masks in SCAPE may follow an analogous process and would also use non-blind deconvolution techniques for image restoration.

Returning to FIG. 1, for any given position of the scanning element 125, a sheet of excitation light 142 is projected into the sample 145 at a corresponding position, and a 2D image of the fluorescence from the illuminated plane 142 within the sample 145 is captured by the camera's sensor 195. More specifically, fluorescence from the illuminated plane 142 will be imaged onto a conjugate image plane between lenses 131 and 132, be descanned by the scanning element 125, pass through the dichroic beam splitter 120 and be imaged onto a stationary conjugate image plane between lenses 151 and 155. This conjugate image plane is stationary due to the descanning performed by the scanning element 125. This conjugate image will then be aberrated by the PME 170 as described above and be imaged onto the sensor 195 of the camera 190.

Each frame will then be sequentially read into memory and deconvolved by the processor 199 with an empirically determined system point-spread-function to obtain a reconstructed (i.e. deblurred) image of the oblique section. As explained above, movement of the scanning element 125 causes the sheet of excitation light 142 to move to a different location within the sample. As a result, if a 2D image is captured corresponding to each of a plurality of positions of the scanning element 125, and if each of those images is reconstructed/deblurred as explained above, the result is a stack of deblurred 2-D frames that can be assembled into a 3D volume representing a target volume within the sample 145.

Optionally, a plurality of these 3D volumes may be captured at a plurality of different points in time (e.g., every tenth of a second) in order to depict changes in the volume being imaged (i.e., the volume within the sample) over time.

Figure 5:
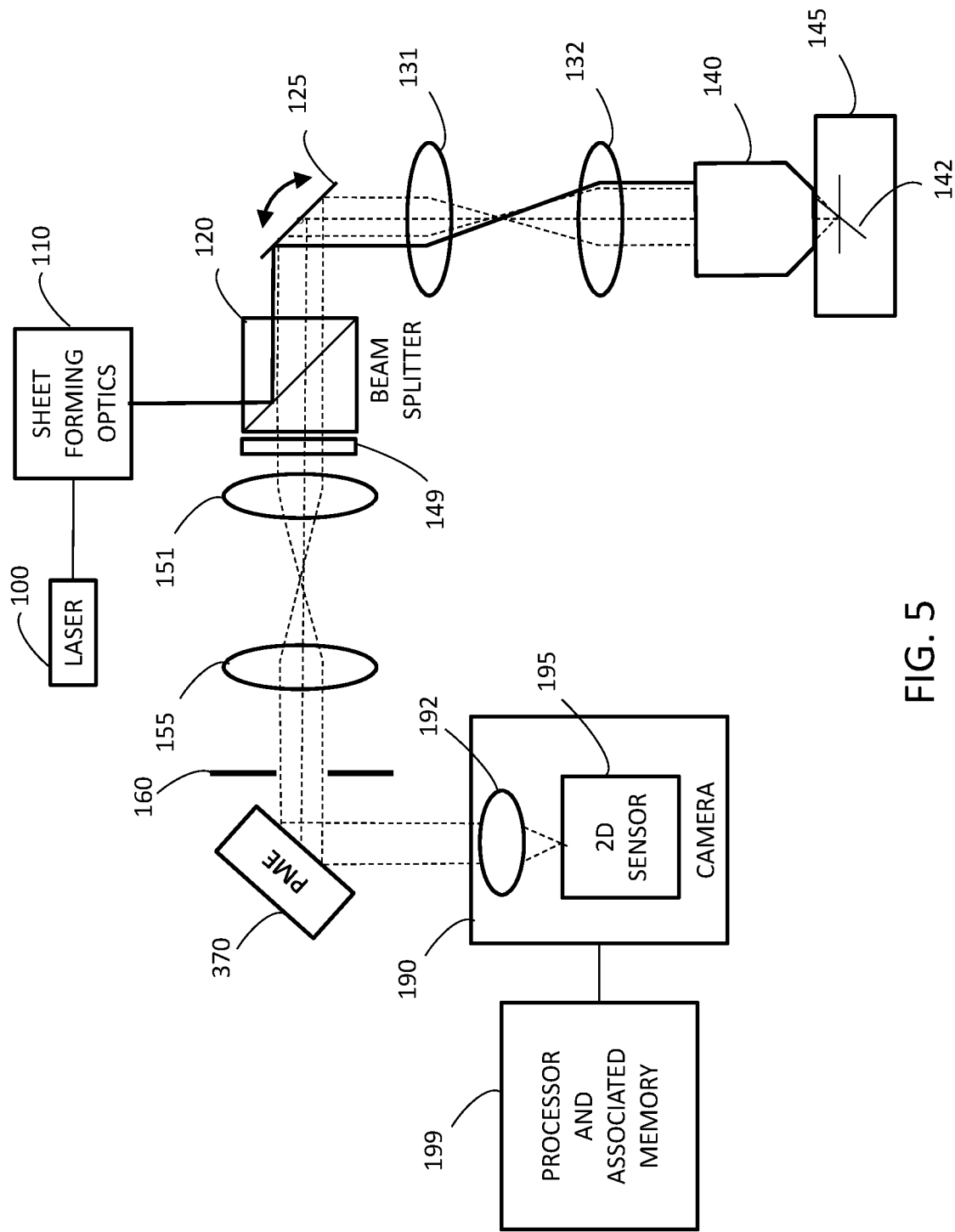
FIG. 5 depicts an embodiment of a SCAPE microscope that uses a reflective phase modulating element.

FIG. 5 depicts an alternative embodiment that is similar to the FIG. 1 embodiment, except that a reflective phase modulating element 370 is used in place of the transmissive phase modulating element (i.e., PME 170 in the FIG. 1 embodiment). Examples of reflective phase modulating elements 370 that may be used in these embodiments include reflective spatial light modulators (SLM) and deformable mirrors (DM), each of which is used to modulate the phase profile of the detected fluorescence. In these embodiments, the reflective phase modulating element 370 is preferably positioned at a plane conjugate to the pupil plane of the primary objective 140. In other regards, this FIG. 5 embodiment operates in the same way as the FIG. 1 embodiment described above.

Figure 6:
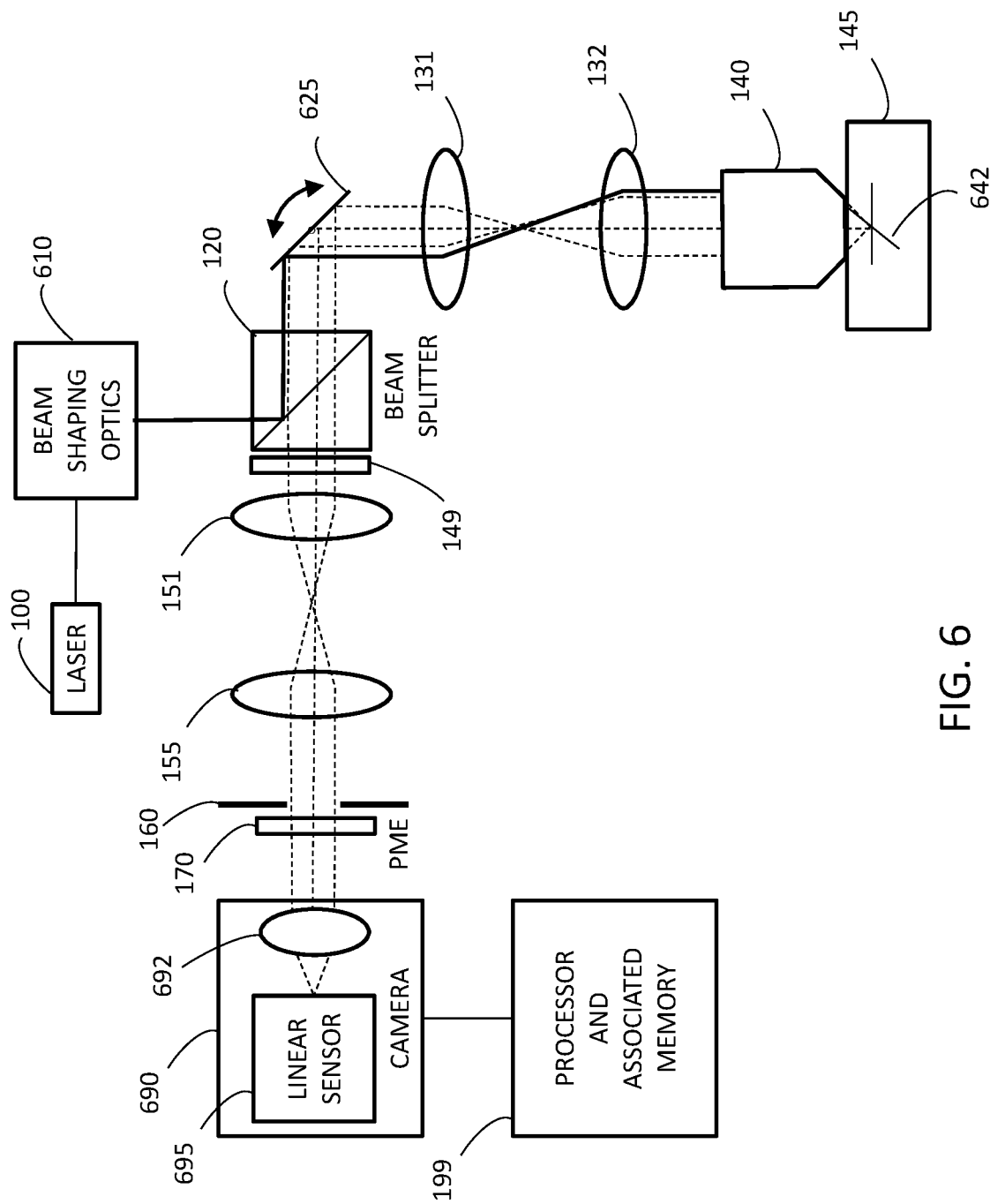
FIG. 6 depicts an embodiment of a SCAPE microscope that uses a phase modulating element, a scanning element with two degrees of freedom, and a linear sensor.

FIG. 6 depicts another alternative embodiment that has many similarities to the FIG. 1 embodiment, but also has a number of significant differences. More specifically, the FIG. 6 embodiment scans a pencil-shaped beam through the sample using a scanning element 625 with two degrees of freedom (e.g., an X-Y galvanometer scanner). In addition, the FIG. 6 embodiment uses a linear sensor 695 (i.e. a one-dimensional sensor) instead of the 2D sensor described above in connection with the FIG. 1 embodiment.

The FIG. 6 embodiment includes a light source (e.g., laser 100) that emits light (e.g., monochromatic, coherent, polarized light), and this light is directed through beam-shaping optics 610 to improve the characteristics of the pencil-shaped beam. In some embodiments, the beam shaping optics 610 comprises an isotropic beam expander to uniformly magnify the profile of the light source, followed by a circular aperture that clips off the periphery of the beam. The size of this aperture can be used to control the beam thickness under the objective 140, and by extension the depth of field of the microscope.

Light exiting the beam-shaping optics 610 enters the dichroic beam splitter 120, which separates the shorter wavelength light used for excitation of fluorescence from the longer wavelengths of light emitted by the fluorescent molecules. The operation of this beam splitter 120 is similar to the operation described above in connection with FIG. 1. The beam splitter 120 directs the excitation light towards the scanning element 625.

The scanning element 625 may be implemented using a planar scanning mirror with two degrees of freedom such as an X-Y galvanometer. But in alternative embodiments, a wide variety of alternative approaches for implementing 2-axis scanning may be used, including but not limited to non-planer scanning mirrors, moving prisms, etc. The excitation light arriving from the dichroic beam splitter 120 at the scanning element 625 is reflected and scanned by the scanning element 625, after which it continues on through the first set of optical components 131-140. The operation of these components 131-140 is similar to the operation described above in connection with FIG. 1.

After passing through the first set of optical components 131-140, the excitation light will project into a sample 145 that is positioned distally beyond the objective 140. The excitation light is projected into the sample 145 at an oblique angle, and the position of the excitation light within the sample 145 varies depending on an orientation of the scanning element 625. Note that the operation of this FIG. 6 embodiment to this point is similar to the operation of the FIG. 1 embodiment discussed above, with one significant exception: instead of projecting a true or virtual sheet of excitation light into the sample 145 at an oblique angle, the FIG. 6 embodiment projects a pencil-shaped beam of excitation light 642 into the sample 145 at an oblique angle. By controlling the position of the scanning element 625 in both the X and Y direction, the pencil-shaped beam of excitation light in this FIG. 6 embodiment can scan through the same volume within the sample that is scanned by the sheet in the FIG. 1 embodiment.

The oblique beam of light 642 will excite fluorescence in the sample 145. Fluorescent light collected from this sample is then collected by the same objective 140. The objective 140 and the remainder of the first set of optical components 131, 132 routes detection light from the sample in a distal to proximal direction back to the scanning element 625. A conjugate image of the detection light is formed between components 131 and 132. The location of this conjugate image plane changes in tandem with the laser light sweeping through the sample 145.

The detection light arriving at the scanning element is rerouted by the scanning element 625 so that the detection light will pass through the second set of optical components 149-170 in a proximal to distal direction. In the illustrated embodiment, the second set of optical components includes an optional emission filter 149 followed by a telescope 151, 155, an aperture stop 160, and a PME 170. Note that in the FIG. 6 embodiment, the detection light will pass through the dichroic beam splitter 120 before entering the proximal-most element the second set of optical components (i.e., lens 151). A conjugate image plane exists between lenses 151 and 155. Notably, the scanning element 625 descans the incoming detection light. As a result of the descanning, this conjugate image plane remains a stationary, despite the fact that the excitation light is scanning different sections of the sample 145 in object space.

Light from the conjugate image plane continues through the distal lens 155 of the telescope and into the phase modulating element 170. The phase modulating element is positioned in the detection optical path at a position that is distal to the dichroic beam splitter 120. In some preferred embodiments, the PME 170 is positioned conjugate to the pupil plane of the objective 140. The implementation of the PME 170 in this FIG. 6 embodiment follows the same principles discussed above in connection with the FIG. 1 embodiment.

Optionally, a circular aperture 160 and/or a long-pass emission filter 149 may be included, as described above in connection with the FIG. 1 embodiment.

After being modulated by the PME 170, the light is captured using a camera 690. The camera is optically positioned to capture images formed by the detection light that has passed through the second set of optical components. In its simplest form, the camera 690 in this embodiment is a single lens 692 that converges image light onto a one-dimensional sensor 695 (i.e., a linear array).

At any given position of the scanning element 625, a beam of excitation light 642 is projected into the sample 145 at a corresponding position, and a linear image of the fluorescence from the illuminated line 642 within the sample 145 is captured by the camera's sensor 695. More specifically, fluorescence from the illuminated line 642 will be imaged onto a conjugate image plane between lenses 131 and 132, be descanned by the scanning element 625, pass through the dichroic beam splitter 120 and be imaged onto a stationary conjugate image plane between lenses 151 and 155. This conjugate image plane is stationary due to the descanning performed by the scanning element 625. This conjugate image will then be aberrated by the PME 170 as described above and be imaged onto the sensor 695 of the camera 690 as a frame of data.

Each frame of data corresponds to a single line of the fluorescence emanating from a line 642 within the sample 145 at a different point in time. This line will be composed of a plurality of pixels. In some embodiments, the size of each pixel in the linear sensor 695 is between 5 and 10 microns. In alternative embodiments, larger pixels are used, in which case there will be less resolution in the depth direction. In other alternative embodiments, the pixel size remains the same (i.e., 5-10 microns), but adjacent pixels are binned together (e.g., in groups of 4 or 8) to provide increased sensitivity, albeit with decreased resolution in the depth direction.

Because movement of the scanning element 625 causes any the beam of excitation light 642 to move to a different location within the sample, if a linear image is captured corresponding to each of a plurality of positions of the scanning element 625, the result is a bundle of frames (similar to a bundle of toothpicks) that can be assembled by processor and associated memory 199 into a 3D volume representing a target volume within the sample 145.

Optionally, a plurality of these 3D volumes may be captured at a plurality of different points in time (e.g., every tenth of a second) in order to depict changes in the volume being imaged (i.e., the volume within the sample) over time.

In this FIG. 6 embodiment, deconvolution is not necessary. But in some embodiments, 1D deconvolution may optionally be implemented to deblur each of the 1D images before those images are assembled into a 3D volume. In alternative embodiments, linear filtering techniques may be used instead of 1D deconvolution.

In alternative embodiments, the PME 170 of the FIG. 6 embodiment may be replaced with a reflective PME, similar to the way that the PME 170 in the FIG. 1 embodiment was replaced with a reflective PME 370 in the FIG. 3 embodiment.

In contrast to those embodiments of SCAPE that implement image rotation using two objective lenses in the detection arm placed at an angle with respect to one another, the optical components 149-170 in the detection arm and the camera 190/690 of the FIGS. 1, 5, and 6 embodiments share a single optical axis. As a result, almost all the light that passes through the telescope 151-155 in the detection arm will continue onward towards the camera 190/690. This configuration advantageously avoids the large losses that are inherent in many prior art SCAPE designs that use an off-axis camera. One complication with this design is that when the camera 190/690 and the detection arm share a single optical axis, it introduces on aberration into the image. But this aberration is corrected algorithmically as explained above.

In this case, although the conjugate image plane is oblique with respect to the optical axis, the camera 190/690 (aligned along the optical axis, as opposed to an oblique angle) will image the oblique conjugate image plane as a unidimensionally compressed projection onto the surface of its sensor 195/695. The PME 170 will aberrate the resulting image, in addition to extending the depth of field of the image reaching the camera 190/690. These aberrations are corrected algorithmically in the processor 199, e.g., by deconvolution of a measured or simulated point spread function as explained above.

The FIGS. 1, 5, and 6 embodiments described above can advantageously simplify alignment, improve resolution, improve light throughput, and enhance the effective detection numerical aperture (with respect to the two objective lens embodiments). Superior signal-to-noise ratio can be achieved due to these improvements. This improved S/N can be leveraged in many ways, including imaging at faster rates with shorter exposure times in order to reach higher volumetric frame rates and imaging with lower laser intensity reducing photobleaching and damage caused to the samples. This configuration may also be able to reduce the cost of the system by using a microscope-style objective with a lower NA (e.g., NA~0.5) and reducing the total footprint. It may be applied towards endoscopic implementations of SCAPE for rapid in vivo pathology in human tissue or for light-starved, multi-photon implementations of SCAPE. In these implementations, the fluorescence may be excited at very low probabilities with lasers in the NIR-IR spectrum (700-1600 nm). As a result, the fluorescence to be collected is significantly weaker than for single photon applications (with lasers from 300-700 nm) and could benefit from the improved light collection efficiency of the FIGS. 1, 5, and 6 embodiments.

Notably, the numerical aperture, resolution, and light throughput of the FIGS. 1, 5, and 6 embodiments are all governed by the characteristics of a single primary objective 140. By changing this lens (e.g., using a turret), it becomes possible to provide the modularity of a benchtop microscope (e.g., with a number of standardized magnifications, resolutions, and depths of field) while performing fast, volumetric imaging over a large field of view. In some embodiments, this may involve switching in a different PME 170 (e.g., a different phase plate) in tandem with the switching of the objective, or altering the phase profile on a programmable phase modulating element (e.g., a deformable mirror or SLM) to account for the changed objective or an alternative modification. Finally, in comparison to Olarte's, Tomer's and Quirin's decoupled illumination/detection scheme in light sheet microscopy, the SCAPE system's lack of orthogonal beam paths extends the application of the technologies to large samples such as rodent cortices.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An imaging apparatus comprising:
a first set of optical components having a proximal end and a distal end, wherein the first set of optical components includes an objective disposed at the distal end of the first set of optical components;
a second set of optical components having a proximal end and a distal end, wherein the second set of optical components includes a phase modulating element;
a scanning element that is disposed proximally with respect to the proximal end of the first set of optical components and proximally with respect to the proximal end of the second set of optical components,
wherein the scanning element is arranged to route excitation light arriving at the scanning element so that the excitation light will pass through the first set of optical components in a proximal to distal direction and project into a sample that is positioned distally beyond the objective, wherein the excitation light is projected into the sample at an oblique angle, and wherein the excitation light is projected into the sample at a position that varies depending on an orientation of the scanning element,
wherein the first set of optical components is arranged to route detection light from the sample in a distal to proximal direction back to the scanning element, and
wherein the scanning element is also arranged to route the detection light so that the detection light will pass through the second set of optical components in a proximal to distal direction; and
a camera optically positioned to capture images formed by the detection light that has passed through the second set of optical components,
wherein the phase modulating element induces a controlled aberration so as to homogenize point spread functions of points at, above, and below a focal plane when measured at the camera.

2. The apparatus of claim 1, wherein the phase modulating element comprises a spatial light modulator.

3. The apparatus of claim 1, wherein the objective has a pupil plane, and the phase modulating element is positioned at a plane that is conjugate to the pupil plane of the objective.

4. The apparatus of claim 3, further comprising an aperture stop positioned (a) adjacent to the phase modulating element and (b) proximally with respect to the phase modulating element.

5. The apparatus of claim 1, wherein the detection light forms a stationary conjugate image plane between the proximal end and the distal end of the second set of optical components.

6. The apparatus of claim 1, wherein the light detector array comprises a 2D image sensor,
wherein the camera sequentially captures a plurality of images formed by the detection light that has passed through the second set of optical components, each of the plurality of images corresponding to a respective frame of image date, and
wherein the apparatus further comprises a processor programmed to correct for aberration in the frames of image data.

7. The apparatus of claim 6, wherein the processor corrects for aberration in the frames of image data by performing deconvolution of a point spread function.

8. The apparatus of claim 7, wherein the point spread function is either a measured point spread function or a simulated point spread function.

9. The apparatus of claim 1, wherein the excitation light comprises a sheet of excitation light.

10. The apparatus of claim 1, further comprising:
a beam splitter disposed between the proximal end of the second set of optical components and the scanning element; and
a source of the excitation light,
wherein the source of the excitation light is aimed so the excitation light is directed into the beam splitter,
wherein the beam splitter is arranged to route the excitation light towards the scanning element,
wherein the beam splitter is arranged to route detection light arriving from the scanning element into the proximal end of the second set of optical components,
wherein the light detector array comprises a 2D image sensor,
wherein the excitation light comprises a sheet of excitation light, wherein the camera sequentially captures a plurality of images formed by the detection light that has passed through the second set of optical components, each of the plurality of images corresponding to a respective frame of image date, and wherein the apparatus further comprises a processor programmed to correct for aberration in the frames of image data.

11. The apparatus of claim 10, wherein the processor corrects for aberration in the frames of image data by performing deconvolution of a point spread function.

12. The apparatus of claim 11, wherein the objective has a pupil plane, and the phase modulating element is positioned at a plane that is conjugate to the pupil plane of the objective.

13. The apparatus of claim 1, wherein the phase modulating element has a phase profile of $$\theta(x,y)=2\pi\alpha(x^3+y^3),$$

where x and y are normalized pupil coordinates and a is a tuning parameter set to $|\Psi/2|$, where $$\Psi(u_2,v_2;dz)=-(1/2\lambda)*NA^{2}*(u_2^2+v_2^2)*dz/n,$$

where $\lambda$ is a wavelength of light passing through the phase modulating element, NA is a numerical aperture of the objective, u and v are normalized pupil coordinates, n is an index of refraction of an immersion medium underneath the objective, and dz is one half of a range of depths to be imaged.

14. An imaging apparatus comprising:
an objective;
a plurality of optical elements disposed in a detection path arranged to receive light from the objective, wherein the plurality of optical elements disposed in the detection path includes a scanning element,
wherein the scanning element is arranged to (a) route excitation light into the objective so as to generate a sweeping excitation beam through a forward image plane of the objective and (b) simultaneously route image light returning through the objective along the detection path to form a conjugate image;
a light detector array positioned to capture images of the conjugate image; and
a phase modulating element disposed in the detection path between the scanning element and the light detector array, wherein the phase modulating element extends a depth of field in the detection path.

15. The apparatus of claim 14, wherein the phase modulating element extends the depth of field by inducing a controlled aberration so as to homogenize point spread functions of points at, above, and below a focal plane when measured at the light detector array.

16. The apparatus of claim 15, wherein the aberration is corrected by deconvolution of a measured or simulated point spread function.

17. The apparatus of claim 16, wherein the light detector array comprises a 2D image sensor.

18. The apparatus of claim 14, wherein the light detector array comprises a linear image sensor.

19. An imaging apparatus comprising:
a light source;
a cylindrical lens or a scanner that expands light from the light source into a sheet of light;
a beam splitter disposed in a path of the sheet of light;
a scanning element disposed in a path of the sheet of light;
a first telescope having a proximal end and a distal end, with an objective disposed at the distal end of the first telescope;
a second telescope having a proximal end and a distal end, the second telescope having an optical axis,
wherein the beam splitter routes the sheet of light towards the scanning element, wherein the scanning element routes the sheet of light into the proximal end of the first telescope, wherein the first telescope routes the sheet of light in a proximal to distal direction through the objective, accepts fluorescent light through the objective and routes the fluorescent light in a distal to proximal direction back to the scanning element, wherein the scanning element routes the fluorescent light through the beam splitter and into the proximal end of the second telescope, and wherein the second telescope forms an image from the fluorescent light at a conjugate image plane;
a camera positioned on the same optical axis as the second telescope and configured to capture blurred images of the conjugate image plane;
a phase modulating element disposed between the second telescope and the camera; and
an image processor programmed to deblur images captured by the camera.

20. The apparatus of claim 19 wherein the phase modulating element comprises at least one of a spatial light modulator and a deformable mirror.

* * * * *